(12) United States Patent
Bland et al.

(10) Patent No.: US 11,954,799 B2
(45) Date of Patent: Apr. 9, 2024

(54) COMPUTER-IMPLEMENTED METHOD FOR GENERATING A 3-DIMENSIONAL WIREFRAME MODEL OF AN OBJECT COMPRISING A PLURALITY OF PARTS

(71) Applicant: SO REAL DIGITAL TWINS AG, Wabern (CH)

(72) Inventors: Ian Ravenshaw Bland, Langenthal (CH); Max Sacker, Berlin (DE)

(73) Assignee: So Real Digital Twins AG, Bern (CH)

( * ) Notice: Subject to any disclaimer, the term of this patent is extended or adjusted under 35 U.S.C. 154(b) by 54 days.

(21) Appl. No.: 17/639,209

(22) PCT Filed: Apr. 15, 2020

(86) PCT No.: PCT/IB2020/053552
§ 371 (c)(1),
(2) Date: Feb. 28, 2022

(87) PCT Pub. No.: WO2021/038309
PCT Pub. Date: Mar. 4, 2021

(65) Prior Publication Data
US 2022/0245896 A1    Aug. 4, 2022

(30) Foreign Application Priority Data
Aug. 28, 2019 (EP) ..................... 19194142

(51) Int. Cl.
*G06T 15/00* (2011.01)
*G06T 7/10* (2017.01)
(Continued)

(52) U.S. Cl.
CPC ............ *G06T 17/20* (2013.01); *G06T 7/10* (2017.01); *G06T 7/90* (2017.01); *G06T 11/003* (2013.01); *G06T 15/04* (2013.01); *G06V 10/764* (2022.01)

(58) Field of Classification Search
CPC .. G06T 7/10; G06T 7/90; G06T 17/20; G06T 11/003; G06T 17/10; G06T 19/20; G06T 15/04; G06T 2219/2008; G06V 10/764
(Continued)

(56) References Cited

U.S. PATENT DOCUMENTS 5,920,319 A    7/1999   Vining et al.
6,711,433 B1   3/2004   Geiger et al.
(Continued)

FOREIGN PATENT DOCUMENTS

WO    WO-2018/127715 A1    7/2018

OTHER PUBLICATIONS

Lin CH, Kong C, Lucey S. Learning efficient point cloud generation for dense 3d object reconstruction. Inproceedings of the AAAI Conference on Artificial Intelligence Apr. 27, 2018 (vol. 32, No. 1).*
(Continued)

*Primary Examiner* — Phu K Nguyen
(74) *Attorney, Agent, or Firm* — Blank Rome LLP

(57) ABSTRACT

A computer-implemented method (100) for generating a 3-dimensional wireframe model (13) of an object (2) comprising a plurality of parts, comprising: Scanning (10) the object (2), preferably with a computer tomography method (10*a*), so as to generate a voxel map; —Computing (12) a 3 dimensional wireframe model (13) of the object; —Segmenting (14) into a plurality of 3 dimensional wireframe part models (15), each 3 dimensional part model corresponding to one part of the object; Using a self-learning machine for classifying (16) said parts into part classes (17); —Adapting (18) the quality of the 3 dimensional wireframe part models depending on at least one quality parameter selected by the user (70) independently for at least one/one or more class (c1, c2, . . . cn). A texture may be applied to the model by photogrammetry and/or PBR.

19 Claims, 3 Drawing Sheets

(51) Int. Cl.
*G06T 7/90* (2017.01)
*G06T 11/00* (2006.01)
*G06T 15/04* (2011.01)
*G06T 17/20* (2006.01)
*G06V 10/764* (2022.01)

(58) Field of Classification Search
USPC .......................................................... 345/418
See application file for complete search history.

(56) References Cited

U.S. PATENT DOCUMENTS

| | | | | |
|---|---|---|---|---|
| 11,599,968 | B2* | 3/2023 | Schwarz | ................... G06T 7/70 |
| 2001/0044576 | A1 | 11/2001 | Vining | |
| 2016/0225192 | A1* | 8/2016 | Jones | ..................... A61B 34/20 |
| 2018/0344290 | A1* | 12/2018 | Veronesi | ................ A61B 8/466 |
| 2021/0358210 | A1* | 11/2021 | Yu | ........................... G06T 17/20 |
| 2022/0245896 | A1* | 8/2022 | Bland | ....................... G06T 7/10 |
| 2023/0104782 | A1* | 4/2023 | Gupta | ...................... G06N 3/08 |
| | | | | 345/424 |

OTHER PUBLICATIONS

Gkioxari G, Malik J, Johnson J. Mesh R-CNN. arXiv e-print arXiv:1906.02739. Jun. 6, 2019.*
Bardyn T, Reyes M, Larrea X, Büchler P. Influence of smoothing on voxel-based mesh accuracy in micro-finite element. InComputational biomechanics for medicine 2010 (pp. 85-93). Springer New York.*
Boyd SK, Müller R. Smooth surface meshing for automated finite element model generation from 3D image data. Journal of biomechanics. Jan. 1, 2006;39(7):1287-95.*
International Search Report & Written Opinion for PCT/IB2020/53552, dated Jul. 30, 2020, 18 pages.
P. Cignoni, et al., "A Comparison of Mesh Simplification Algorithms", Computers.& Graphics, vol. 22, No. 1, 1998, pp. 37-54.

* cited by examiner

COMPUTER-IMPLEMENTED METHOD FOR GENERATING A 3-DIMENSIONAL WIREFRAME MODEL OF AN OBJECT COMPRISING A PLURALITY OF PARTS

RELATED APPLICATIONS

This patent application is a national stage of International Application No. PCT/IB2020/053552, filed on Apr. 15, 2020, which claims the priority from European Patent Application No. EP19194142.6, filed on Aug. 28, 2019. The contents of these applications are hereby incorporated by reference in their entireties.

FIELD OF THE INVENTION

The present invention concerns a computer-implemented method for generating a 3-dimensional model of an object, based on volumetric scanning of the object. In particular, the present method generates a virtual twin of the object.

DESCRIPTION OF RELATED ART

Software games and computer animated movies or video rely on a growing demand for 3-dimensional models. At present, the animation in those fields mostly relies on 3-dimensional wireframe models that an artist or engineer originates on a computer with a 3-dimensional modeling software. This is a cumbersome and work-heavy procedure which can take up to several weeks of working time for modelling complex objects.

It has also been suggested to create 3-dimensional wireframe models by scanning a real-world object so as to generate a point clouds from which a wireframe 3-dimensional model can be computed. However, common 3-dimensional scanners, such as photogrammetry, time-of-flight 3-dimensional laser scanner and triangulation laser scanners can only scan the outer surface of the object and are therefore unable to generate a 3-dimensional representation of the inner parts or components of the object. Those inner parts often need to be part of the model, for example when the object need to be opened, split in parts, or broken as part of the scenario.

Volumetric scanning, such as computer tomography, microtomography and MRI, has also been used for acquiring a digital representation of an object and its interior. Notably, volumetric scanning has been widely used in the medical field for medical observation and diagnosis, or in the industry for non-destructive materials testing, reverse engineering, or studying biological and paleontological specimens. It produces a 3-dimensional voxel map which is often represented by projecting a selected layer on a 2D surface. Voxel maps produce a very precise representation of the whole volume of the object, but often result in very voluminous data files making them poorly adapted to animation and game software where a fast rendering, fast manipulation and limited storage requirements are needed.

In order to reduce the size of the representation, it has also been suggested to compute a 3-dimensional wireframe model from such a 3-dimensional voxel map delivered by computer tomography (CT). As an example, patent application US2001044576A discloses a method for effecting interactive and three-dimensional renderings of selected body organs for medical observation and diagnosis. In US2001044576A, a series of CT images is stacked to form a three-dimensional volume file. From a selected volume or sub-volume, the image of a selected body organ is segmented or isolated. A wireframe model of the segmented organ image is then generated to enable interactive, three-dimensional rendering of the selected organ.

Another solution is proposed in U.S. Pat. No. 6,711,433B disclosing a method for providing a virtual contrast agent for blood vessels in a body portion for angioscopy comprising deriving data from a 3-dimensional model using, for example, magnetic resonance imaging, computerized tomography and 3-dimensional angiogram. The voxel map data is segmented to provide a segmented 3-dimensional model of the blood vessels. The 3-dimensional model is then registered with the first procedural image and "virtual camera parameters" are obtained.

Moving away from the medical field, inspecting and visualization of complex industrial objects has been disclosed in WO2018/127715A1, which provides a method for obtaining a 3-dimensional model of a plurality of components of an object, such as for example a complex engine of a vehicle. The method comprises a step of scanning the object, so as to generate 2D x-ray data which is then processed to obtain multi-resolution 3D x-ray data, i.e. a greyscale representation of each elementary volume ("voxel") of the object.

The 3D x-ray data is then divided into subsets, wherein each subset contains several tens or more components. A subset may correspond to a module or a subassembly of the object. Each subset is then processed (e.g. by using algorithms to sharpen the image, reduce artifacts in the images, improve the contrast, etc), wherein the processing may result in a different image quality for different subsets. A CAD model of each component is then generated, using a representation as a collection of connected surfaces such as NURBSs. Although the quality of representation of components in different subsets may vary, depending on the image processing that is applied to this subset, the size of representation of components does not depend on the subset to which they belong. The optimization occurs in the voxel domain only.

3-dimensional wireframe models that are generated from 3-dimensional voxel maps delivered by volumetric scanners such as computer tomography equipment usually have a very large number of polygons, due to the high resolution of the data files delivered by the CT equipment. The data files are therefore very heavy and require a lot of storage space and computing power for storage and processing. While this high resolution of the 3-dimensional wireframe model might be desirable in applications for medicine or industry, where small details often need to be detected on one single 2D image, computer games and video animation rely on many 3-dimensional wireframe models with a low polygon count in order to accelerate rendering.

3-dimensional optimization software is therefore widely used in the prior art for simplifying the 3-dimensional wireframe models and reducing the size of a 3-dimensional wireframe model. While those methods are efficient to reduce the number of polygons of a model, they have no impact on other parameters of the model that might impact its size.

It is often the case that different parts of an object, such as for example different components of a complex object, need a different quality of representation. As an example, outer surfaces of a virtual representation of a device often need a more precise representation than inner surfaces which are less likely to be displayed.

However, all parts of a complex models are subject to the same optimization. The optimization therefore needs to be adapted to the parts or components of the object, such as the outer surfaces, that require the highest quality of rendering; the optimization of the parts of the same object that could be represented by a model of lower quality is sub-optimal. Again, this might result in 3-dimensional wireframe models which are heavy and slow to manipulate, since even parts of the models that only require a low quality are represented with a high-quality 3-dimensional wireframe model.

It could be considered to manually define a different quality of 3-dimensional wireframe models for different components of a complex object. This would be a very cumbersome process however if the object comprises a large quantity of components for which the quality of the model needs to be adjusted individually.

It is an aim of the present invention to obviate or mitigate at least some of the above-mentioned disadvantages.

In particular, it would be desirable to generate a 3D wireframe model of an object with a limited data size but still a high quality of representation, especially for the important parts of the object.

It would also be desirable to improve the rendering of the colours and textures of the model.

BRIEF SUMMARY OF THE INVENTION

According to the invention, these aims are achieved by means of a computer-implemented method for generating a 3-dimensional wireframe model of an object comprising a plurality of parts, comprising the steps of:

Scanning the object, preferably with a computer tomography method, so as to generate a voxel map;
Segmenting into a plurality of part models, each part model corresponding to one part of the object;
Classifying said parts into part classes;
Generating a 3-dimensional wireframe part model of each part, wherein the quality of the 3 dimensional wireframe part models depends on at least one quality parameter selected by the user independently for each class.

The segmentation and classification of different parts of the object can thus be used in order to define a limited number of classes of parts, and to define the quality of models to apply to each class.

The classes are preferably user defined; a user can define new classes.

The classification of the parts into classes is preferably generated with a self-learning module, such as an artificial neural network.

A user can teach the self-learning system how to classify parts in new classes, or improve the classification into existing classes. The self-learning system will be trained with this feedback, and improves the classification of other parts.

At least one class includes a plurality of parts. Adapting the quality of the class automatically impacts the quality of the 3-dimensional wireframe part model of each part in that class.

In one embodiment, the method generates a dynamic 3-dimensional wireframe model from a previously generated static 3-dimensional wireframe model of a scanned object. A dynamic 3-dimensional model is a model where different parts are associated with physical properties such as mass, center of mass, and/or stiffness for example, so that the model can be used in a simulation or video game and react to its environment in a realistic way. For example, a virtual force applied to such a dynamic 3-dimensional wireframe model has an impact on the representation of the object that depends on its mass, center of mass and/or stiffness.

The steps of computing, segmenting, classifying and/or adapting are preferably performed without any user intervention (apart for defining the required quality for each class), thus expediting the generating process of the 3-dimensional wireframe model.

In one embodiment, the step of segmenting is performed on the voxel map, resulting in a plurality of part voxel maps corresponding to each segmented part. Each part voxel map is then converted into a 3-dimensional wireframe part model.

The other steps of the methods are independent of the manner and type of data on which the segmentation is performed.

Alternatively, the voxel map of the object is converted into a single 3-dimensional wireframe model which is then segmented into a plurality of 3-dimensional wireframe models.

Preferably, the quality parameter for each part determines the number of polygons used for representing that part.

The step of adapting the quality of the 3-dimensional wireframe part models may comprise computing an optimized 3-dimensional wireframe part model for the part, wherein the number of polygons of each part depends on said quality parameter.

In a preferred method, the quality parameter for one part determines whether a texture and/or color should be applied to that part.

Adapting the quality of the 3-dimensional wireframe models may thus comprise determining whether a texture and/or color should be applied to one part.

Preferably, the quality parameter for one part determines whether the mass and/or center of mass of the part should be determined.

Preferably, the quality parameter for one part determines the number of break points or break lines of the part.

Preferably, the step of adapting at least one quality parameter comprises individually adapting a plurality of quality parameters for each class.

More preferably, the step of adapting at least one quality parameter comprises selecting a global quality factor.

Further, the object comprises at least one component, and wherein one of said component comprises a plurality of parts for which different 3-dimensional models with different qualities should be applied.

More preferably said classes comprise at least one among the following: inert object or inner component.

Further, said classes comprise at least one among the following: outer surface; inner surface.

Preferably one self-learning module is used for said segmenting.

The method may comprise a step of scanning the object with a computer tomography method, and a further step acquiring a colour and/or texture of the object with a photogrammetry. Therefore, a high quality of rendering of the colours and/or textures of at least the outer surfaces of the object can be achieved.

The acquisition of colour and/or texture of the object with a photogrammetry method may comprise a scanning of the object, distinct from the scanning with a computer tomography method.

The method may comprise a step of registering data generated from computer tomography scanning with data generated from photogrammetry and/or Physical Based Rendering.

The registration may use a reference mark on the object.

The reference mark may be added manually. Alternatively, the reference mark may be extracted automatically and correspond for example to an edge or corner of the object.

The colours and/or textures may be applied to said wireframe to improve the rendering of the object using a Physical Based Rendering method.

The colours and/or textures may be used for improving the segmentation of the object into parts. For example, a change of colour and/or texture may be detected and correspond to a limit between two adjacent parts.

The colours and/or textures may also or alternatively be used for said classifying of classes into parts. For example, a part with a fine structure may be classified into a group of parts that will be described with a finer model than a part with a less fine texture.

Photogrammetry can only indicate the colour and/or texture of outer surfaces of the object. The method may include a step of assuming the colour and/or texture of inner surfaces of said object.

The assumption may use data generated from computer tomography scanning and/or data generated from photogrammetry for determining the material and/or appearance of inner surfaces/inner parts of the object.

The assumption may use a classification system, such as an artificial intelligence system, for determining the most likely colour and/or texture of inner surfaces of said object.

At least one 3-dimensional model data file may be stored in an online platform and made available to a plurality of users.

The invention is also related to a computer-implemented method for generating a 3-dimensional wireframe model of an object comprising a plurality of parts, comprising the steps of:
 Scanning the object with a computer tomography method, so as to generate a voxel map;
 Scanning the object by photogrammetry in order to retrieve colours and textures of outer surfaces of the object;
 Aligning the data retrieved by computer tomography and the data retrieved by photogrammetry;
 Generating a 3-dimensional model of the object.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

According to the present invention, the computer-implemented method provides a series of method steps for generating a 3-dimensional wireframe model of an object, in order to generate a so-called virtual twin of an object.

Figure 1:
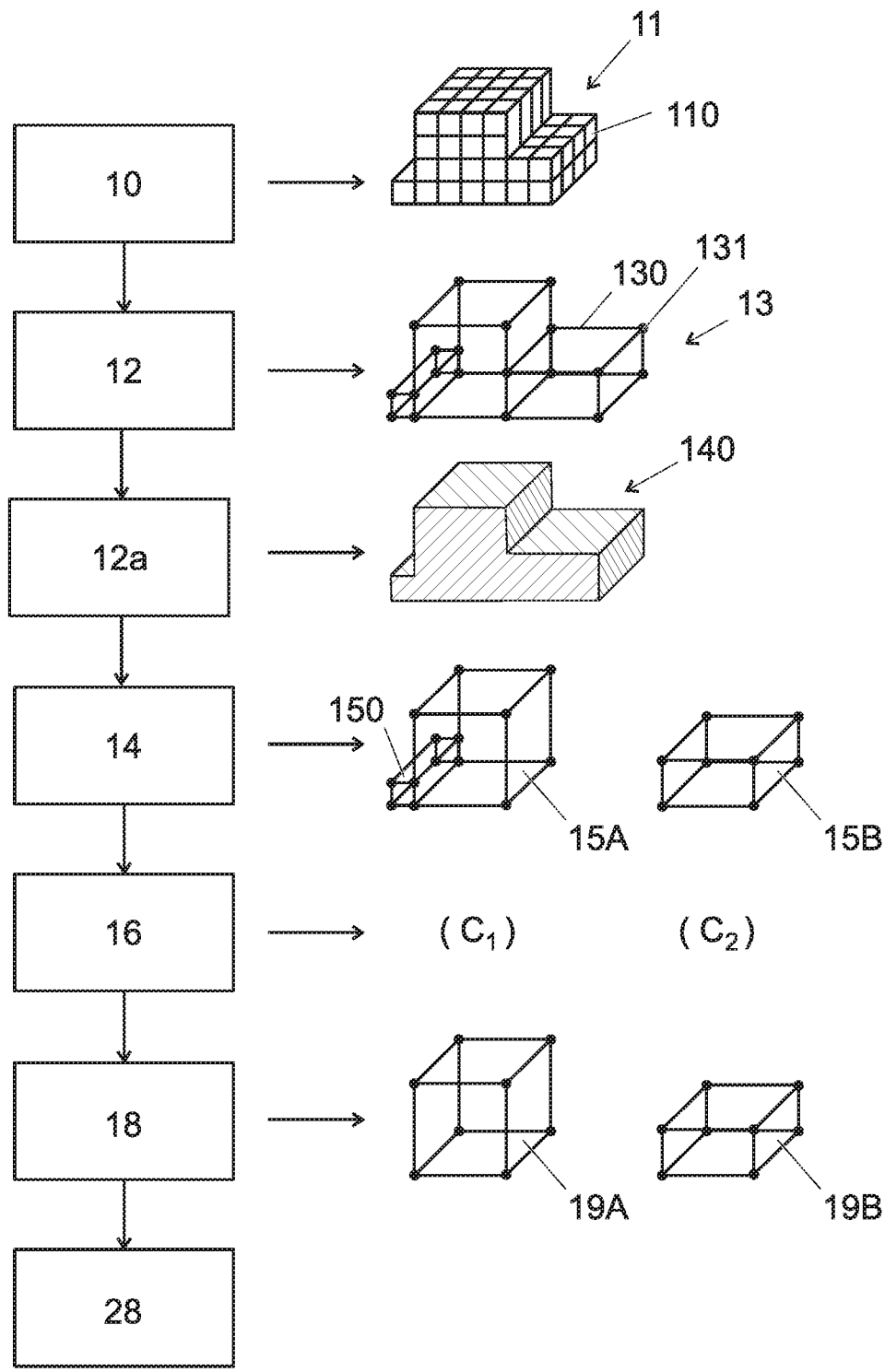
FIG. 1 shows various steps of a possible embodiment of the computer implemented method of the invention.

As show in FIG. 1, the method comprises a step 10 of volumetric scanning a real-world object, preferably by a computer tomography (CT) method. The CT scan is a well-established method both in the medical field and in the manufacturing industry for inspection purposes. A CT scan generates a voxel map 11 comprising a set of voxels 110, each being defined by its position and at least one value. The voxel map may be post processed by cropping, removing noise, adding colour values to some or each voxel, etc.

At step 12, a 3-dimensional wireframe model 13 is computed from the voxel map. This model is static, i.e., it only comprises edges 130 (lines) and vertices 131, and no information about mass, center of mass or stiffness.

Figure 3:
FIG. 3 illustrates an example of image file produced by a photogrammetry and/or PBR scanning system.

At optional step 12*a*, the object is scanned using a photogrammetry scanning system in order to generate a 2D image file 14 representing the colours and textures of the outer surfaces of the object. An example of such an image file 14 is represented on FIG. 3.

The wireframe model or part models generated from the computer tomography scanning is aligned with the 2D image data generated by photogrammetry.

In one example, the 2D image file generated by photogrammetry is wrapped around the outer surfaces of the wireframe model, in order to generate a wireframe representation 140 of the object with textures and coloured outer surfaces.

The registration may use a reference mark on the object, such a a feature. This reference mark may be added manually to the object before the two scanning steps. Alternatively, the reference mark may be extracted automatically and correspond for example to an edge or corner of the object.

Alternatively, the colours and/or textures can be selected manually by the user, and/or automatically determined based on an analysis of the nature or material of each surface.

Photogrammetry can only indicate the colour and/or texture of outer surfaces of the object. The method may include a step of assuming the colour and/or texture of inner surfaces of said object.

The assumption of the colour and/or texture of the inner surfaces of the object may use data generated from computer tomography scanning and/or data generated from photogrammetry for determining the material and/or appearance of inner surfaces/inner parts of the object.

The assumption may use a classification system, such as an artificial intelligence system, for determining the most likely colour and/or texture of inner surfaces of said object.

In another embodiment, the colours and/or textures are added at a later stage to some or all of the 3-dimensional wireframe part models.

The colours and/or textures may be applied to said wireframe to improve the rendering of the object, using for instance a Physical Based Rendering method, for adding for example textures and/or colours to at least some of the surfaces between lines.

At step 14, the 3-dimensional wireframe model 13 is segmented into a plurality of 3-dimensional wireframe part models 15A, 1B, etc. Each 3-dimensional wireframe part model represents one part of the object; a part could be for example a separate component, or a distinct surface of the object. In the example, the first part 15A comprises a portion 150 with shorter edges that requires a higher resolution.

In one example, each component of a mechanical object comprising a plurality of components, such as for example distinct gears in a watch, is a part for which a distinct 3-dimensional wireframe part model is obtained by this segmentation step.

In another example, a single component could have distinct surfaces, such as for example an inner surface and an outer surface, representing different parts for which distinct 3-dimensional wireframe part models are obtained by the segmentation.

The segmentation may be based for example on a detection of empty volume between two parts, and/or in differences in materials or density between parts. Some parts might also be isolated based on their position, for example in order to distinguish external parts from internal ones-. Some parts might be identified manually by the user on the user interface, for example by drawing lines between parts.

The colours and/or textures as determined by photogrammetry may be used for improving the segmentation of the object into parts. For example, a change of colour and/or texture may be detected and correspond to a limit between two adjacent parts.

The segmentation step 14 may be fully or partly automated and may use known segmentations algorithms, or alternatively machine learning/artificial neural network modules to isolate the different parts.

The 3-dimensional wireframe part models 15 are then classified during step 16 into a plurality of user-defined classes c1, c2, ..., cn, each class comprising one or a plurality of 3-dimensional wireframe part models. This classification may be performed manually, or preferably by a classifier, such as a software classifier, preferably a self-learning machine such as an artificial neural network previously trained by the user or otherwise. The user may correct the classification of some part models, possibly resulting in a new training of the self-learning machine and automatic reclassification of other 3-dimensional wireframe part models.

The classification of the 3-dimensional wireframe part models may for example depend on their size, on their location, on a type of part that may be automatically recognized, or on any other parameters.

In one example, one of the classes corresponds to inert objects such as furnitures or background items. Another class may be defined for foreground objects that need to be open or broken. Further classes may be defined for outer surfaces or respectively inner surfaces.

The colours and/or textures may also or alternatively be used for said classifying of classes into parts. For example, a part with a fine structure may be classified into a group of parts that will be described with a finer model than a part with a less fine texture.

A user can add or edit new classes and train the self-learning machine to recognize automatically parts that should belong to a new or newly edited class. In one embodiment, the user can assign some or each of the parts to one user-selected class; no self-learning classifier is then required for classifying those parts. For example, a user may manually classify those parts which will play an important role for his use and which need a more precise model.

At step 18, each 3-dimensional wireframe part model is adapted (i.e., optimized) by reducing the number of polygons of the model. This optimization depends on a user-defined quality assigned to each class. For example, a user can determine that parts belonging to a class c1 should be more optimized, resulting in smaller files, than parts belonging to another class c2. On FIG. 1, this stronger optimization of models in class 1 results in the removal of some polygons (portion 150 disappeared).

The user-defined quality for each class may also determine whether a colour and/or a texture should be applied to the models in one class, and/or the size of the texture pattern if one is applied.

The user-defined quality for each class may also determine whether light refection parameters needs to be associated to the outer surfaces of the part.

The user-defined quality for each class may also determine whether the corresponding part should be dynamic. For example, the quality may determine whether the mass of the object needs to be determined to the objects in one specific class.

The user-defined quality for each class may also determine whether the center of mass of the object needs to be determined to the objects in one specific class. For most use cases, the center of mass is equal to the center of gravity.

The user-defined quality for each class may also determine whether the stiffness of the object needs to be determined to the objects in one specific class.

The user-defined quality for each class may also determine whether the part model may be breakable and if it comprises break points or break lines.

The user-defined quality for each class may also determine the maximal size of each model; the number of polygons and/or the textures or other parameters of the representation of one part are chosen or adapted in order to obtain a 3-dimensional wireframe model of the part with a suitable size, for example a size lower than a threshold.

The user-defined quality for each class may also correspond to an overall quality factor, which may be a combination of several parameters.

Various parameters of the models, for example the number of polygons, and/or the size of the texture, etc, are adapted in order to obtain a 3-dimensional wireframe model of the part that corresponds to that quality factor.

As an example: a part corresponding to an external surface of an object shall be classified as such, and be associated with a texture, such as for example a metallic surface, and a high number of polygons. Another part, such as for example a less important inner component such as a bolt, may be assigned to a different class and receive a simple colour instead of an elaborated texture, and a lower number of polygons.

The optimized 3-dimensional wireframe model of the object, comprising the plurality of individually optimized wireframe part models for each part of the model, is then stored in a repository 28. In one example, the repository may be an Internet platform for sharing the model among a plurality of users.

In the above described embodiment, the voxel map of the whole object is converted into a 3-dimensional wireframe model of the whole object, and the segmentation into a plurality of 3-dimensional wireframe part models is performed at step 14 on the wireframe model. This might be effective for example if the segmentation can be made by analyzing the 3-dimensional mesh, for example if the 3-dimensional wireframe part models are disconnected or poorly connected, or with some a priori assumptions about the shape, dimensions and/or position of each part. For example, distinguishing outer surfaces parts from inner surfaces parts can be performed on an already converted wireframe model.

In another embodiment (not illustrated), the segmentation is performed on the voxel map of the object, resulting in a plurality of part voxel maps (part models) which are then individually converted into 3-dimensional wireframe part models. The adaptation of the quality of each wireframe part model can be performed during the conversion, and/or by optimizing a converted 3-dimensional wireframe part model. This embodiment may be more effective for segmenting parts having different densities or x-ray attenuations which may be part of the voxel values in the voxel map delivered by the CT scan.

Both embodiments could also be combined and a first segmentation could be performed on the voxel map, for example in order to segment components having different densities or attenuations, before a second segmentation on converted 3-dimensional wireframe models, for example in order to segment outer surfaces.

The above described methods generate 3-dimensional wireframe models of different parts of an object with various qualities and size. Lower quality models need less storage space and are faster to manipulate than high quality models. However, the quality of the rendering may also be adapted to each class of part; for example, a high quality 3-dimensional wireframe model can be used either for generating a high-quality rendering of that part, or a possibly faster but lower quality rendering. The classification of the parts in different classes may be used not only for the generation of the model, but also for determining the type or quality of rendering.

Figure 2A:
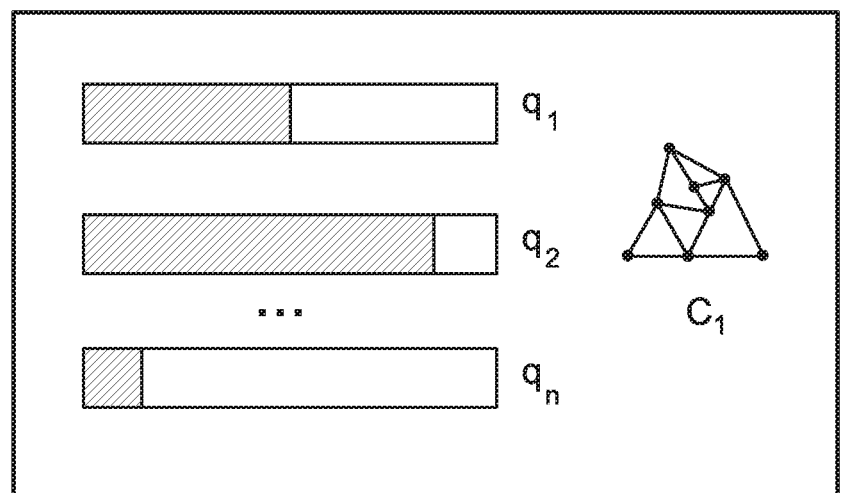
FIG. 2*a* shows a screen representation of a first embodiment of a user interface.

FIG. 2a illustrates an example of user interface that may be presented to a user in order to determine the quality of all the 3-dimensional wireframe part models in one class, here c1. The interface presents a number of user interface widgets, such as for example sliders, tick boxes, text or value boxes, etc, for individually selecting the value of a plurality of quality parameters q1, q2, . . . , qn. Optionally, a preview representation of some parameters may be displayed, for example in order to select one texture or colour to be applied to one specific class.

Figure 2B:
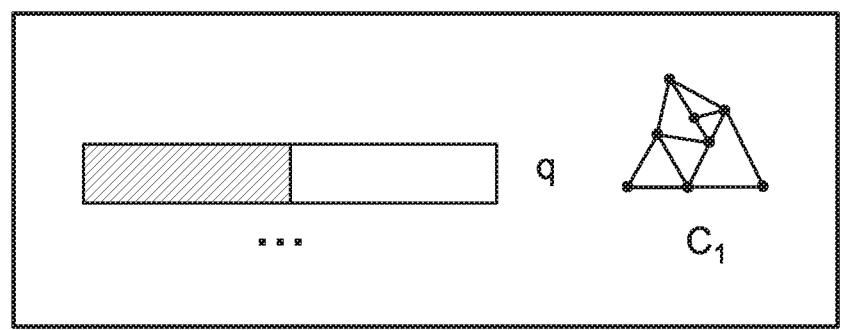
FIG. 2*b* shows a screen representation of a first embodiment of a user interface.

FIG. 2b illustrates another example of user interface that may be presented to a user in order to determine the quality of all the 3-dimensional wireframe part models in one class, here c1. The interface presents one single user interface widgets, such as for example a slider or a value box, for determining a single quality parameter q applied to the class; this single factor might be a weighted combination of several quality parameters. The optimization module automatically determines the best way to optimize the part model in order to reach that quality parameter.

The invention is also related to a computer program for carrying out some or all the above described steps. The computer program may be stored in a non-transitory computer readable medium. Furthermore, the invention is related to a data structure and/or a data repository system comprising at least one 3-dimensional wireframe model of an object obtained with a method as previously described.

Additional Features and Terminology

In the present application, the expression "voxel map" designates any representation of a 3-dimensional physical object where the object is represented with values on a regular grid in three-dimensional space. The value may indicate the presence of a solid object at a given position; in some embodiments, the value may also indicate a local x-ray attenuation, a grey level, a local density, etc. Furthermore, the local mass can also be derived from a CT scan and indicated for each voxel.

In the present application, the expression "3-dimensional wireframe model" designates any representation of a 3-dimensional physical object where the object is represented with its edges and vertices. A 3-dimensional wireframe model may also comprise other visual parameters, such as textures and/or colours for some surfaces, and/or physical parameters such as mass, center of mass and/or stiffness for example.

3-dimensional wireframe models can efficiently represent 3-dimensional structures with lots of empty or homogeneously filled volumes, while voxel maps are more useful at representing volumes spaces that are non-homogeneously filled, such as biologicals tissues. Computer games and computer animation usually need 3-dimensional wireframe models as the rendering and manipulation tends to be faster.

The proposed method can be carried out on any computer equipment, including without restrictions personal computers, graphic stations, servers, virtual servers, tablets, smartphones and the like.

Depending on the embodiment, certain acts, events, or functions of any of the algorithms described herein can be performed in a different sequence, can be added, merged, or left out altogether (for example, not all described acts or events are necessary for the practice of the methods).

Moreover, in certain embodiments, acts or events can be performed concurrently, for instance, through multi-threaded processing, interrupt processing, or multiple processors or processor cores or on other parallel architectures, rather than sequentially. In addition, different tasks or processes can be performed by different machines or computing systems that can function together.

The various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, a microprocessor, a state machine, a digital signal processor (DSP), an application specific integrated circuit (ASIC), a FPGA, or other programmable logic device, discrete gate or transistor logic, discrete hardware components, or any combination thereof designed to perform the functions described herein.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The invention claimed is:

1. A computer-implemented method for generating a 3-dimensional wireframe model of an object comprising a plurality of parts, comprising:
   Scanning the object, using a computer tomography method, so as to generate a voxel map;
   Segmenting the object into a plurality of part models, each part model corresponding to one part of the object;
   Classifying said parts into part classes;
   Selecting by a user at least one quality parameter independently for each class;
   Generating a 3-dimensional wireframe part model of each part, wherein the quality of the 3-dimensional wireframe part models depends on the at least one quality parameter selected by the user,
      wherein said quality parameter determines the number of polygons used for the representation of a part.

2. The method of claim 1, wherein said quality parameter determines whether a texture and/or color should be applied to one part.

3. The method of claim 1, wherein said quality parameter determines whether the mass and/or center of mass of the part should be determined.

4. The method of claim 1, wherein said quality parameter determines the number of break points or break lines of the part.

5. The method of claim 1, said step of classifying comprising using a self-learning machine for classifying said parts into part classes.

6. The method of claim 1, wherein said step of scanning the object is performed with a computer tomography method so as to generate a voxel map;
and wherein the method further comprises acquiring a colour and/or texture of the object by photogrammetry.

7. The method of claim 6, wherein said colour and/or texture is applied to said wireframe to improve the rendering of the object using a Physical Based Rendering method.

8. The method of claim 7, further comprising a step of assuming the colour and/or texture of inner surfaces of said object using data generated from computer tomography scanning and/or data generated from photogrammetry.

9. The method of claim 6, wherein said colour and/or texture is used for said segmentation of the object.

10. The method of claim 6, wherein said colour and/or texture is used for said classifying of classes into parts.

11. The method of claim 6, comprising a step of registering data generated from computer tomography scanning with data generated from photogrammetry and/or Physical Based Rendering, using a reference mark on the object.

12. The method of claim 1, said step of generating comprising adapting the quality of the 3 dimensional wireframe part models depending on said at least one quality parameter selected by the user independently for at least one/one or more class.

13. The method of claim 12, wherein the object comprises at least one component, and wherein one of said component comprises a plurality of parts for which different 3-dimensional wireframe models with different qualities should be applied.

14. The method of claim 1, wherein the step of adapting at least one quality parameter comprises individually adapting a plurality of quality parameters for each class.

15. The method of claim 1, wherein the step of adapting at least one quality parameter comprises selecting a global quality factor.

16. The method of claim 1, wherein said classes comprise at least one among the following:
   inner component;
   outer surface;
   inner surface.

17. The method of claim 16, wherein a plurality of 3-dimensional wireframe models is stored in an online platform and made available to a plurality of users.

18. A data structure and/or a data repository system comprising an at least one 3-dimensional wireframe model of an object obtained by performing a method according to claim 17.

19. A non-transitory computer readable medium comprising a computer program for carrying out a method according to claim 1.

* * * * *